(12) United States Patent
Hyckenberg et al.

(10) Patent No.: US 12,321,162 B2
(45) Date of Patent: Jun. 3, 2025

(54) METHOD AND SYSTEM FOR MONITORING A BIO-PHARMACEUTICAL PROCESS

(71) Applicant: Cytiva Sweden AB, Uppsala (SE)

(72) Inventors: Key Hyckenberg, Uppsala (SE); Magnus Karlsson, Uppsala (SE); Christoffer Hultqvist, Uppsala (SE); Henrik Lundkvist, Uppsala (SE)

(73) Assignee: Cytiva Sweden AB, Uppsala (SE)

( * ) Notice: Subject to any disclaimer, the term of this patent is extended or adjusted under 35 U.S.C. 154(b) by 366 days.

(21) Appl. No.: 17/437,085

(22) PCT Filed: Mar. 18, 2020

(86) PCT No.: PCT/EP2020/057515
§ 371 (c)(1),
(2) Date: Sep. 8, 2021

(87) PCT Pub. No.: WO2020/193327
PCT Pub. Date: Oct. 1, 2020

(65) Prior Publication Data
US 2022/0163955 A1    May 26, 2022

(30) Foreign Application Priority Data
Mar. 27, 2019 (GB) .................................. 1904231

(51) Int. Cl.
G05B 23/02 (2006.01)
G05B 19/418 (2006.01)

(52) U.S. Cl.
CPC ... G05B 23/0216 (2013.01); G05B 19/41835 (2013.01); G05B 19/41875 (2013.01); G05B 2219/31472 (2013.01)

(58) Field of Classification Search
CPC .................. G05B 23/0216; G05B 2219/31472
(Continued)

(56) References Cited

U.S. PATENT DOCUMENTS 5,351,200 A    9/1994 Impink, Jr.
5,553,304 A    9/1996 Lipner et al.
(Continued)

FOREIGN PATENT DOCUMENTS

CN    102902873 A    1/2013
EP    2110720 A2    10/2009
(Continued)

OTHER PUBLICATIONS

PCT International Search Report and Written Opinion for PCT/EP2020/057515 mailed May 18, 2020 (10 pages).
(Continued)

*Primary Examiner* — Jigneshkumar C Patel
(74) *Attorney, Agent, or Firm* — Eversheds-Sutherland (US) LLP

(57) ABSTRACT

The present disclosure relates to a method and system for monitoring a bio-pharmaceutical process, said bio-pharmaceutical process being controlled based on as set of instructions for controlling said biopharmaceutical process. The method comprises the following steps performed by a bio-pharmaceutical process monitoring element: obtaining (S11) said set of instructions for controlling the biopharmaceutical process, and while the instructions of the set of instructions for controlling the bio-pharmaceutical process are executed, for each executed instruction receiving (S13) an execution status update indicating which instruction is presently executed or has just been finished, and forming (S14) an execution status indication relating the instruction presently executed or just finished to its position in the set of instructions based on the received execution status update.

23 Claims, 6 Drawing Sheets

(58) Field of Classification Search
USPC .......................................................... 700/83
See application file for complete search history.

(56) References Cited

U.S. PATENT DOCUMENTS

| | | | |
|---|---|---|---|
| 5,881,115 A | 3/1999 | Lipner et al. | |
| 2009/0125126 A1 | 5/2009 | Moore et al. | |
| 2009/0164933 A1 | 6/2009 | Pederson et al. | |
| 2012/0011231 A1* | 1/2012 | Li | H04L 41/0883 709/220 |
| 2012/0095740 A1* | 4/2012 | Kitagawa | G06Q 10/04 703/6 |
| 2013/0218352 A1* | 8/2013 | Iovanni | G01N 30/465 700/282 |
| 2014/0094947 A1* | 4/2014 | Marruchella | G05B 19/41835 700/104 |
| 2016/0103596 A1* | 4/2016 | Schultz | G01N 30/8662 715/709 |
| 2018/0129458 A1* | 5/2018 | Asai | G06F 3/1211 |

FOREIGN PATENT DOCUMENTS

| | | |
|---|---|---|
| EP | 2645192 A1 | 10/2013 |
| EP | 3291038 A1 | 3/2018 |
| JP | 2009-123213 A | 6/2009 |
| JP | 2018-522309 A | 4/2018 |
| WO | 2018/122196 A1 | 7/2018 |

OTHER PUBLICATIONS

Great Britain Search Report for GB Application No. 1904231.6 mailed Sep. 27, 2019 (4 pages).
Japanese Office Action for JP Application No. 2021-557152, mailed Jan. 29, 2024 (10 pages).
Chinese Office Action for CN Application No. 202080024055.X, mailed Jan. 5, 2024 (23 pages).
Chang Peng, Intellectual Property Publishing House, Research on statistical modeling and fault monitoring of intermittent processes, Edition 01, Jan. 31, 2018, pp. 1-15. (abstract).

* cited by examiner

METHOD AND SYSTEM FOR MONITORING A BIO-PHARMACEUTICAL PROCESS

CROSS REFERENCE TO RELATED APPLICATIONS

This application claims the priority benefit of PCT/EP2020/057515, filed on Mar. 18, 2020, which claims the benefit of Great Britain Application No. 1904231.6, filed Mar. 27, 2019, the entire contents of which are incorporated by reference herein.

TECHNICAL FIELD

The present disclosure relates to a method for monitoring a bio-pharmaceutical process, said bio-pharmaceutical process being controlled based on a set of instructions for controlling said biopharmaceutical process.

The present disclosure further relates to a system for monitoring a bio-pharmaceutical process.

BACKGROUND

The past decade has seen a significant shift in the nature of the products being manufactured and sold by the innovative biopharmaceutical industry. The global biopharmaceutical portfolio of today reflects a greater prevalence of large molecule drugs, expansion in the number of personalized or targeted products, and a rise of treatments for many orphan diseases. These development trends provide for biopharmaceutical products with extremely limited production runs, highly specific manufacturing requirements, and genotype-specific products. The on-going shift in the product mix provides a need for continuous improvement of the efficiency and effectiveness of production biopharmaceutical manufacturing.

Biologic medicines (also called biologics) such as for example therapeutic proteins, monoclonal antibodies, vaccines etc., are complex molecules made by or from living cells. They often require parenteral administration by infusion or injection, thereby requiring highly specialized manufacturing, special storage and handling, and a tightly controlled, high quality manufacturing and distribution network to ensure safety and effectiveness. Developments are also observed with regard to orphan drugs, i.e., drugs aimed at diseases with patient populations of under 200,000, and there has been a steady increase over the past decade. Furthermore, manufacturers are increasingly focusing on more complex diseases for which there are few or no effective treatments. New treatments for these diseases are characterized by small volume products.

Another important trend within biopharmaceuticals is the emergence of personalized medicine; products that target a specific population of patients. Over time, as patient-level personalized medicines are introduced, manufacturing and product supply complexity will likely increase. In general, personalized medicines require related bio-manufacturing processes to be conducted in smaller scale and closer to the patient.

These drug portfolio trends have contributed to an increase in the number and complexity of products being manufactured and sold commercially. Overall, these drug portfolio trends indicate that there is a need for improved manufacturing creating flexibility with uncompromised quality, while creating operating efficiencies that can help reduce costs.

Today, processing systems for processing bio-pharmaceutical processes comprise characteristically processing equipment wherein said bio-pharmaceutical process is performed, and a controller arranged to store a set of instructions for controlling the biopharmaceutical process and sequentially executing the instructions of the set of instructions for generating control signals controlling the processing equipment.

SUMMARY

One object of the invention is to facilitate manufacture and in particular test manufacture of a product.

This has been achieved by means of a method for monitoring a bio-pharmaceutical process, said bio-pharmaceutical process being controlled based on as set of instructions for controlling said biopharmaceutical process. The method comprises the following steps performed by a bio-pharmaceutical process monitoring element:

obtaining said set of instructions for controlling the biopharmaceutical process; and while the instructions of the set of instructions for controlling the biopharmaceutical process are executed, for each executed instruction, receiving an execution status update indicating which instruction is presently executed or has just been finished, and forming an execution status indication relating the instruction presently executed or just finished to its position in the set of instructions based on the received execution status update.

Thereby, it will be possible to continuously get a full understanding of the status of the manufacture process. This makes it possible for the user to determine whether the pharmaceutical process is controlled as desired or whether some adaptations to the control of the pharmaceutical process are desired.

Further, a person who has been away can by viewing the formed execution status indication get a full understanding about the status of the biopharmaceutical process.

With the suggested biopharmaceutical process, flexibility with uncompromised quality is obtained, while creating operating efficiencies that can help reduce costs.

A way to easily visualize the progress of a run of a biopharmaceutical process, such as a chromatography run by showing the currently executing instruction in the process/recipe in the same view as the method/recipe may be defined.

The user may be able to graphically follow the system run progress in a display view, which display view at least partly corresponds to view used in programming of the instructions for controlling the biopharmaceutical process.

In different embodiments, the set of instructions for controlling the biopharmaceutical process comprises or is associated to at least one process variable value defining the biopharmaceutical process. The method may then comprise steps of receiving, during execution of the set of instructions, at the biopharmaceutical process monitoring element an update of at least one of said process variable value defining the biopharmaceutical process; and receiving, during the execution of the set of instructions, at a controller for control of the biopharmaceutical process information relating to the update for updated control of the biopharmaceutical process.

This means that it is during the run, possible to change the variable values of the process/recipe. Thus, variable value editing in system control is implemented.

Additional characteristic features of the method may be found in the dependent claims.

The present disclosure further relates to a system for monitoring a bio-pharmaceutical process. The system comprises a processing system comprising processing equipment, in which said bio-pharmaceutical process is performed, and a controller arranged to store a set of instructions for controlling the biopharmaceutical process and executing the instructions of the set of instructions for generating control signals controlling the processing equipment. The controller is further is arranged to, for each executed instruction, generate and transmit an execution status update indicating which instruction is presently executed or has just been finished. The system comprises further a bio-pharmaceutical process monitoring element arranged to receive said execution status indication and to form an execution status indication relating the instruction presently executed or just finished to its position in the set of instructions based on the received execution status update.

Additional characteristic features of the system may be found in the dependent claims.

DETAILED DESCRIPTION

Figure 1:
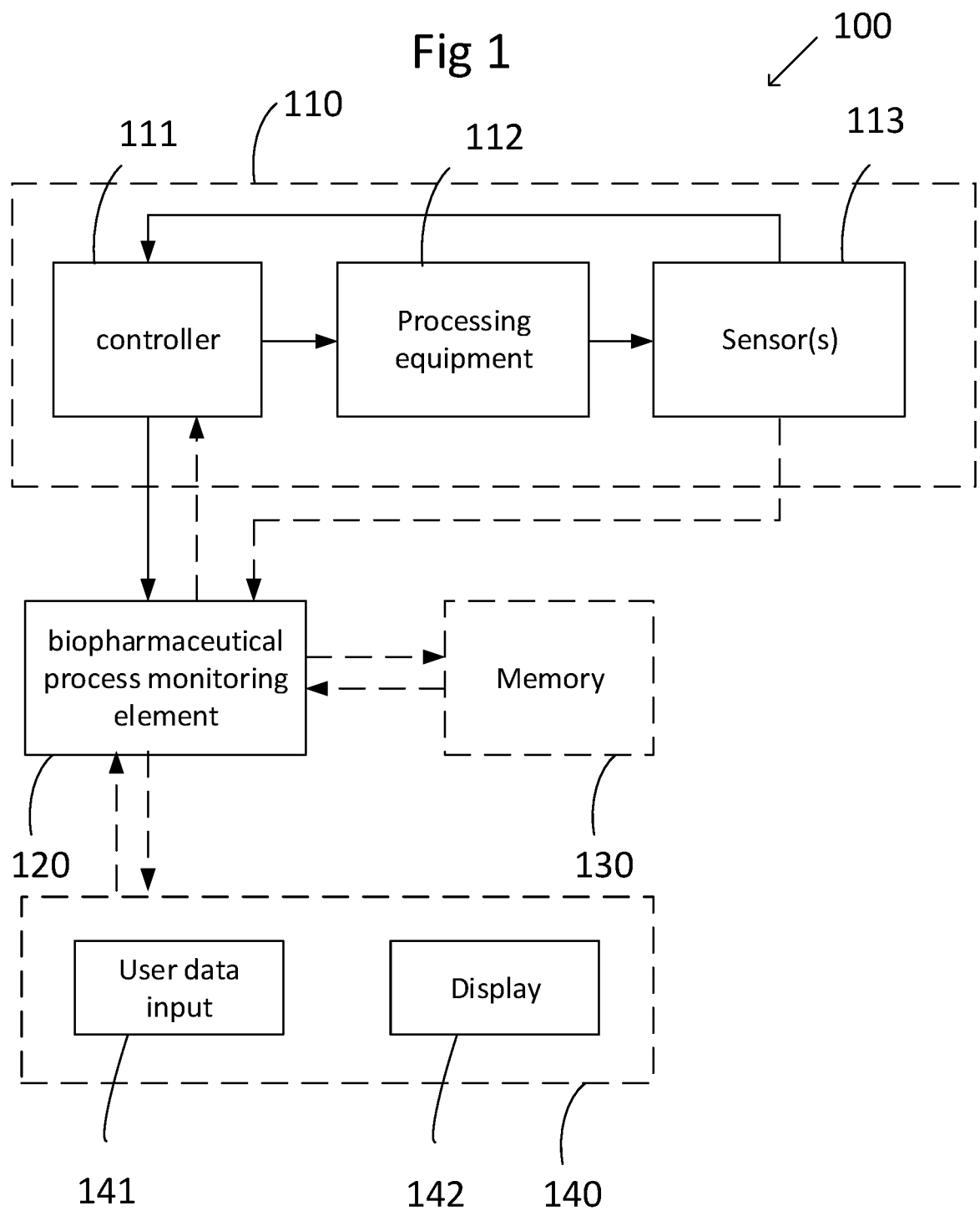
FIG. 1 is a block scheme schematically illustrating an example of a system for monitoring a biopharmaceutical process.

FIG. 1 discloses a system 100 for monitoring a bio-pharmaceutical process. The system 100 comprises a processing system 110. The processing system 110 comprises in the illustrated example processing equipment 112 wherein said bio-pharmaceutical process is performed. The processing equipment 112 may comprise workflow management systems provided by an instrument or system, such as a chromatography system.

The processing system 110 comprises further a controller 111 arranged to store a set of instructions for controlling the biopharmaceutical process. The controller 111 is arranged to execute the instructions of the set of instructions for generating control signals controlling the processing equipment 112.

Thus, the bio-pharmaceutical process is controlled based on a set of instructions for controlling said biopharmaceutical process. In detail this means that the controller executes the instructions of the set of instructions for generating control signals controlling the processing equipment. The set of instructions is arranged to be executed according to a pre-set execution scheme. For example, the set of instructions may be arranged to be sequentially executed, non-sequentially executed, or a combination thereof. Thus, at least some of the instructions may be arranged to be executed in parallel.

The controller 111 is further is arranged to, for each executed instruction, generate and transmit an execution status update indicating which instruction is presently executed or has just been finished.

The processing system 110 may further comprise a plurality of sensors 113 arranged to monitor a status of the processing of the processing equipment.

The processing system 110 may also comprise a display (not shown) arranged to display the monitored status of the processing of the processing element.

The system 100 comprises further a bio-pharmaceutical process monitoring element 120. The bio-pharmaceutical process monitoring element 120 is be arranged to communicate with the controller 111. The bio-pharmaceutical process monitoring system may further be arranged to communicate with the sensor(s) 113, if present. The bio-pharmaceutical process monitoring element 120 is arranged to receive said execution status update and to form an execution status indication relating the instruction presently executed or just finished to its position in the set of instructions based on the received execution status update. The biopharmaceutical process monitoring element 120 may be arranged to store the set of instructions for controlling the biopharmaceutical process. The forming of an execution status indication may comprise to associate the received execution status update to a corresponding instruction in the stored set of instructions.

The set of instructions for controlling the biopharmaceutical process may comprise or be associated to at least one process variable value defining the biopharmaceutical process. The respective variable value may be associated to a particular instruction of the set of instructions or to a plurality of instructions. The respective variable may relate to sensor data and or time data. The respective variable relating to sensor data may be formed based on the sensor data from one or a plurality of the sensors. The variable value defining the biopharmaceutical process relating to sensor data may define a maximum value and/or minimum value and/or allowed interval. The variable value relating to time data may for example define a normal duration or a time interval for a normal duration for execution of a particular instruction or group of instructions of the set of instructions.

The system may further comprise a user interface 140. The user interface may comprise a display 142. The user interface may comprise means for user data input 141 such as a keyboard, a computer mouse or a joystick. The user interface 140 may comprise integrated display 142 means for data input 141, such as a touch screen.

The biopharmaceutical process monitoring element 120 is arranged to provide display data to the display 142. The display 142 is arranged to display the execution status indication. In detail, the display 142 is arranged to display the set of instructions in a display view, said display view at least partly corresponding to the view used in programming. The display of the set of instructions may comprise display of the set of instructions structured in accordance with the pre-set execution scheme. The execution status indication may be displayed by marking the presently executed or just finished instruction in the display view. Also a next instruction for execution may be indicated in the display view.

The user interface 140 with input means 141 may be adapted for user input of the instruction to update at least one process variable value.

In response to obtaining of an instruction to update at least one process variable value during execution of the set of instructions, the biopharmaceutical process monitoring element may be arranged to amend the display view based on the obtained process variable value update and to transmit the updated at least one process variable value or information relating thereto to the controller, wherein the controller is arranged to generate control signals for controlling the processing equipment in accordance with the update.

The biopharmaceutical process monitoring element 120 may be arranged to, for at least of a part of the instructions presently executed or just finished, correlating corresponding obtained sensor data and/or time data with the execution status indication.

The biopharmaceutical process monitoring element 120 may be arranged to monitor the obtained sensor data and/or time data related to the bio-pharmaceutical process; detect when the obtained sensor data and/or time data deviates from a predetermined pattern or value or boundary/boundaries and determine that at least one potential process variable value should be updated. The process variable values may thus be updated to influence the execution of the process while the process is running. Thus, the process variable values may be updated to compensate for unexpected deviations occurring during the run. This may be used for example in order to save the batch presently run by the bio-pharmaceutical process.

The process variable values may be only temporarily updated. Thus, the process variable values may be updated only for the batch presently run. Alternatively, the updating of the process variable value(s) is saved for use also in future executions of the process. The input means 141 may be used for user selection whether an update is permanent or only intended for the present run of the process.

As stated above, the process monitoring element may be arranged to determine that at least one potential process value should be updated. The process monitoring element may also be arranged to determine the updated process value. Alternatively, the process monitoring element determines that the process value should be updated and a user determines and enters the updated process value.

Further, a user may determine that at least one potential process value should be updated based on the detection of when the obtained sensor and/or time data deviates and/or based on the extent of deviations from a predetermined pattern or value or boundary/boundaries. The user may then enter an updated process value.

Further, the set of instructions may comprise jump functions, wherein a jump is performed to a predetermined instruction in the scheme when at least one predetermined condition is fulfilled. For example, a jump to a predetermined instruction may be performed when a predetermined condition for sensor data is fulfilled. The predetermined condition forms a process value such as:

a maximum value, which when reached activates the jump to a predetermined first instruction; and/or
a minimum value, which when reached activates the jump to the predetermined second instruction, wherein the first and second instructions may be the same or different instructions.

In addition thereto or instead, a jump to a predetermined instruction may be performed when a predetermined condition for the time data is fulfilled. The predetermined condition forms a process value such as a normal duration or a time interval for a normal duration for execution of a particular instruction or group of instructions of the set of instructions. When the execution of the instruction or groups of instructions takes longer than the normal duration or when the execution time is outside the time interval for normal duration, the jump to a predetermined instruction is activated.

In addition, thereto or instead, the set of instructions may be designed to allow for user interaction to execute a jump to a desired instruction.

As is clear from the above, the monitoring allows for user interaction while the process is running. A user may learn from detected deviations and interact accordingly. Further or instead, the user may predict potential occurrences of deviations and interact accordingly. Further or instead, the user may predict timings of coming events and to interact accordingly. The user interaction may, as discussed above include updating process value(s) and/or executing jumps in the set of instructions.

The system 100 may further comprise a memory 130 arranged to store the execution status indication and/or the corresponding obtained sensor data, if the latter is present. The memory may store execution status indication and/or corresponding obtained sensor data relating to at least a part of the executed instructions. Thus, the memory allows for storage of process tracking data. Thereby, the information related to the processing may be accessible also after a run. This allows for troubleshooting in a stepwise manner, wherein each instruction along with corresponding sensor data may be viewed and/or analysed. Thus, there is a transparency in the process in that if trouble has occurred, information is accessible indicating where during the run, i.e. at which instruction, the trouble occurred and sensor and/or time data associated to the instructions preceding the occurrence of the trouble are further available. The provided transparency makes the system suitable for example in training personnel in running a process.

Figure 2:
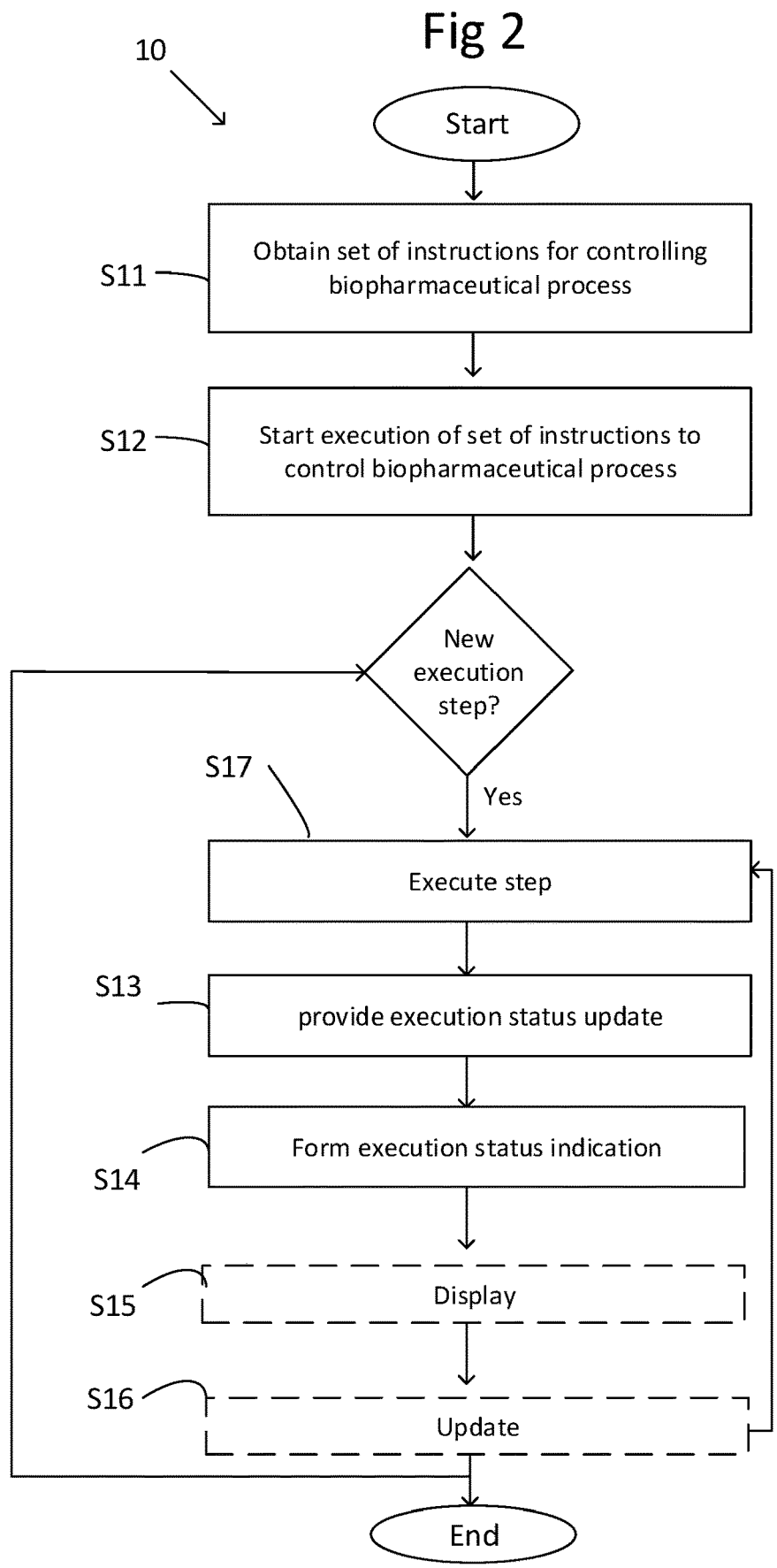
FIG. 2 is a flow chart schematically illustrating an example of a method for monitoring a biopharmaceutical process according to a first aspect.

In FIG. 2, a method 10 for monitoring a bio-pharmaceutical process is illustrated. The bio-pharmaceutical process is controlled based on as set of instructions for controlling said biopharmaceutical process. In detail, control is performed by means of a controller characteristically controlling operation of processing equipment based on said set of instructions and possibly sensor data relating to a status of the biopharmaceutical process.

The method 10 for monitoring the bio-pharmaceutical process comprises obtaining S11 at a biopharmaceutical process monitoring element said set of instructions for controlling the biopharmaceutical process. Thus, the biopharmaceutical process monitoring element obtains the same instructions for controlling the biopharmaceutical process as are used by the controller for control of the biopharmaceutical process.

Then, execution of the set of instructions to control the biopharmaceutical process may be started S12.

The method 10 for monitoring the bio-pharmaceutical process further comprises while executing according to a pre-set execution scheme the instructions of the set of instructions for controlling the biopharmaceutical process, for each executed instruction perform the following.

First, an execution status update is provided S13 to the bio-pharmaceutical process monitoring element. The execution status update indicates which instruction is presently executed or has just been finished.

Thus, characteristically, while the controller for controlling the bio-pharmaceutical process controls execution of the instructions of the set of instructions for controlling the biopharmaceutical process according to the pre-set execution scheme, for each executed instruction the controller transmits the execution status update to the biopharmaceutical monitoring element. Thus, the controller obtains the execution status update and transmits the execution status update to the biopharmaceutical process monitoring element.

Upon reception of the execution update, an execution status indication is formed S14 at the biopharmaceutical process monitoring element. The execution status indication relates the instruction presently executed or just finished to its position in the set of instructions based on the received execution status update. In detail, the execution status indication relates the instruction presently executed or just finished to its position in the set of instructions structured in accordance with the pre-set execution scheme.

The method may further comprise, for at least a part of the instructions presently executed or just finished, displaying S15 the formed execution status indication. Also a next instruction for execution may be displayed S15.

Characteristically, the set of instructions are displayed in a display view. The display view at least partly corresponds to a view used in programming the set of instructions for control of the biopharmaceutical process. Thus in the display view, all or a part of the set of instructions for control are continuously displayed.

The execution status indication is displayed by marking the presently executed or just finished instruction in the display view. For example, the presently executed or just finished instruction may be lightened in the display view. The highlighting may for example be made by marking the presently executed or just finished instruction with a colour. Alternatively, the displayed not presently executed or just finished instructions are presented less brightly, such as in grey and the presently executed or just finished instruction is presented in more brightly, for example in black.

Therefore, when running the biopharmaceutical process, the programmer and others get comprehensive and unambiguous information as to which step in of the execution scheme the bio-pharmaceutical process is presently executing. This is for example advantageous in a testing situation, wherein the biopharmaceutical process is tested. For example, if it from the display view and monitoring of the biopharmaceutical process is evident that after execution of a certain execution step, the properties of the biopharmaceutical process deviate from desired properties, it may be identified that that particular execution step may be modified. For example, it may be determined that a certain loop needs to be carried out an additional number of times in relation to the number defined by the set of instructions. This may actually be taken care of during execution of the process. Thus, an update indicating an amendment of the number of times the loop is to be executed may be communicated S16 to the controller and the controller adapts execution. Thus, the instructions themselves (or variable values relating thereto) may amended during execution of the set of instructions by use of updates. Examples of this may be described more in detail later.

Thus, by use of the display view the biopharmaceutical process can be monitored step-by step during execution of the process. Thereby, improved monitoring of the process is enabled. Further, the step-wise monitoring enables fine-tuning of each execution step in the set of instructions for controlling the biopharmaceutical process. Further, the testing of running the biopharmaceutical process may be accelerated and an acceptable set of instructions may be arrived at faster. This is very important when processing relatively small batches, where the time for setting up of the biopharmaceutical process has a significant impact on the total time for running the batch through the process.

Also the next instruction for execution may be indicated in the display view.

The different examples of implementing a method for monitoring a biopharmaceutical process as discussed in FIG. 2 may be implemented in the system as discussed in relation to FIG. 1.

Figure 3:
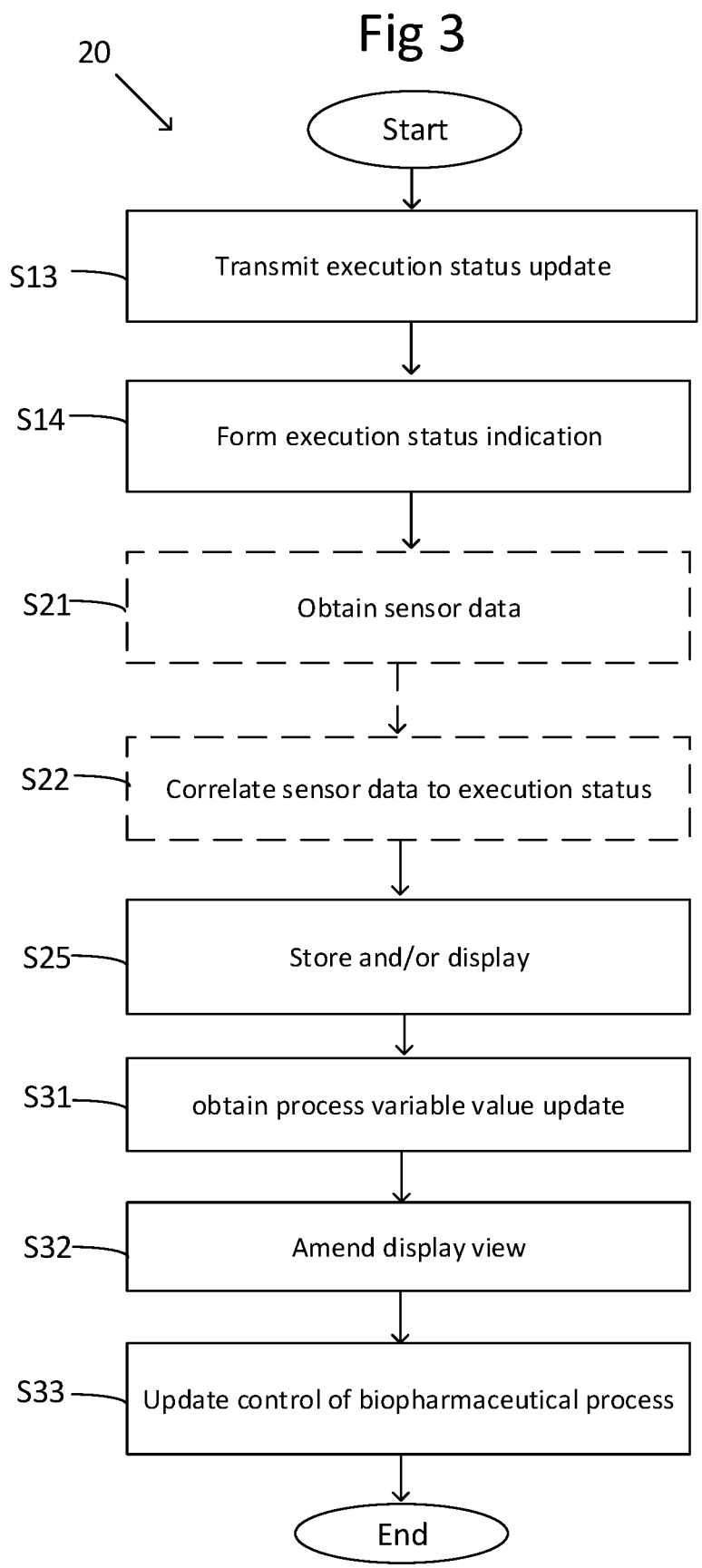
FIG. 3 is a flow chart schematically illustrating an example of a method for monitoring a biopharmaceutical process according to a second aspect.

In FIG. 3, further examples of execution at a biopharmaceutical process monitoring element while a controller for controlling the bio-pharmaceutical process controls execution according to the execution scheme of instructions of a set of instructions for controlling the biopharmaceutical process, as discussed in relation to FIG. 2, are illustrated.

For each executed instruction the biopharmaceutical process monitoring element receives S13, as also discussed in relation to FIG. 1, an execution status update.

An execution status indication is then formed S14. The execution status indication relates the instruction presently executed or just finished to its position in the set of instructions based on the received execution status update.

Further, sensor data related to the bio-pharmaceutical process is obtained S21 at the biopharmaceutical process monitoring element. The sensor data may be obtained from sensors sensing the biopharmaceutical process. Thus, the sensor data may be monitoring processing equipment for performing the biopharmaceutical process and/or the bio-pharma material processed by the processing equipment. The sensor data may be arranged to monitor quantities such as temperature, pressure etc. for use in control and/or monitoring of the biopharmaceutical process.

In the illustrated example, for at least of a part of the instructions presently executed or just finished, corresponding obtained sensor data is correlated S22 with the corresponding execution status indication.

The method may further comprise, for at least a part of the instructions presently executed or just finished, displaying S25 the execution status indication and the corresponding obtained sensor data. As discussed in relation to FIG. 2, characteristically, the set of instructions are displayed in a display view. The display view at least partly corresponds to a view used in programming the set of instructions for control of the biopharmaceutical process.

The method may further comprise, for at least a part of the instructions presently executed or just finished, storing S25 the execution status indication and possibly the corresponding obtained sensor data and/or time data, if present.

In accordance with this example the set of instructions for controlling the biopharmaceutical process comprises or is associated to at least one process variable value defining the biopharmaceutical process.

In accordance with this example, the method comprises a step of receiving S31, during execution of the set of instructions, at the biopharmaceutical process monitoring element an update of at least one of said process variable value defining the biopharmaceutical process.

The display view may then be amended, during execution of the set of instructions, based on the received update of the at least one of said process variable value.

Further, the update or information relating to the update is received S33 during the execution of the set of instructions, at a controller for control of the biopharmaceutical process.

The update of at least one of said process variable value may be received at the biopharmaceutical process monitoring element and/or the controller via a user interface. The update of the at least one of said process variable value may be received at the biopharmaceutical process monitoring element, possibly processed by the biopharmaceutical processing element and the update or information thereto, as processed, may be transmitted to the controller for update of control of the biopharmaceutical process.

The bio-pharmaceutical process monitoring element may monitor obtained sensor data and/or time data) related to the bio-pharmaceutical process, detects when the obtained sensor data and/or time data deviates from a predetermined pattern or value or boundary/boundaries and determine that at least one potential process variable value should be updated based on said detected deviation.

Control of the biopharmaceutical process may be automatically updated based on the at least one potential process variable value or wherein the at least one potential process variable value is fed to a user interface for acceptance/rejection/amendment by the user.

The different examples of implementing a method for monitoring a biopharmaceutical process as discussed in FIG. 3 may be implemented in the system as discussed in relation to FIG. 1.

Figures 4, 6:
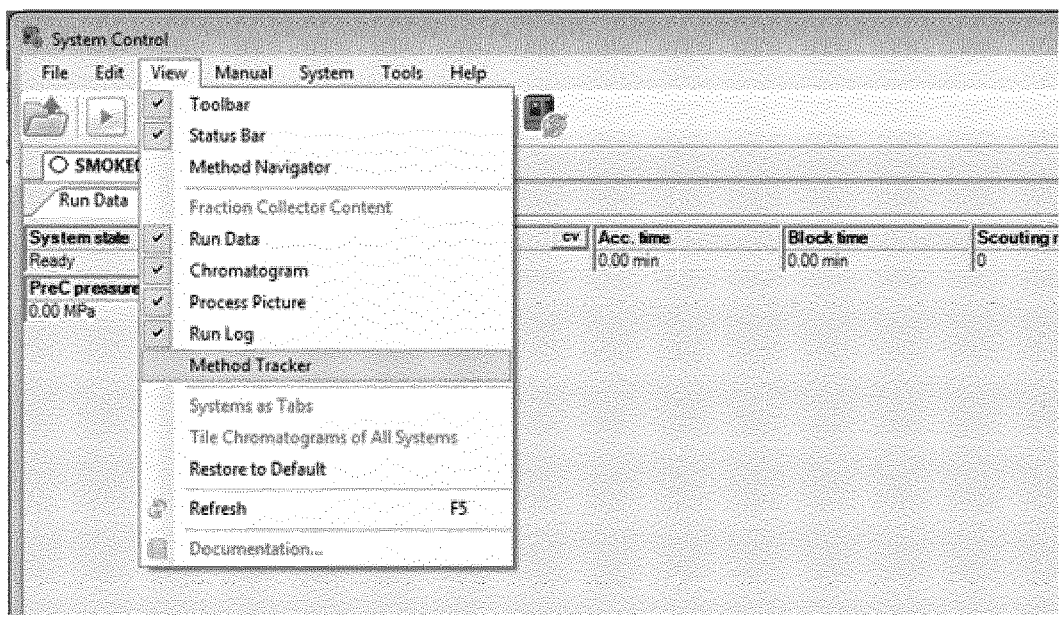
FIG. 4 illustrates schematically an example of a software interface view used for starting monitoring of a biopharmaceutical process.
FIG. 6 illustrates schematically an example of a software interface view used when monitoring a biopharmaceutical process for selection of view of more detailed information.

In FIG. 4, an example of how to start tracking of execution of a set of instructions for controlling a biopharmaceutical process, is illustrated. Starting tracking of execution is in the illustrated example made using a software interface. The software interface is for example provided at the bio-pharmaceutical process monitoring element as discussed herein. The software interface may be presented at a display of the biopharmaceutical process monitoring element, for example the display as discussed in relation to FIG. 1.

In the illustrated example, the software for controlling the bio-pharmaceutical process is denoted "system control". In the illustrated example, the software interface comprises a menu system, where software process control alternatives are selectable in the menu. When selecting the "method tracker" in the menu, tracking of execution of the software is started. In the illustrated example, the "method tracker" is selectable in a view menu.

Once run of the bio-pharmaceutical process has been started, the biopharmaceutical process will be tracked.

Figure 5:
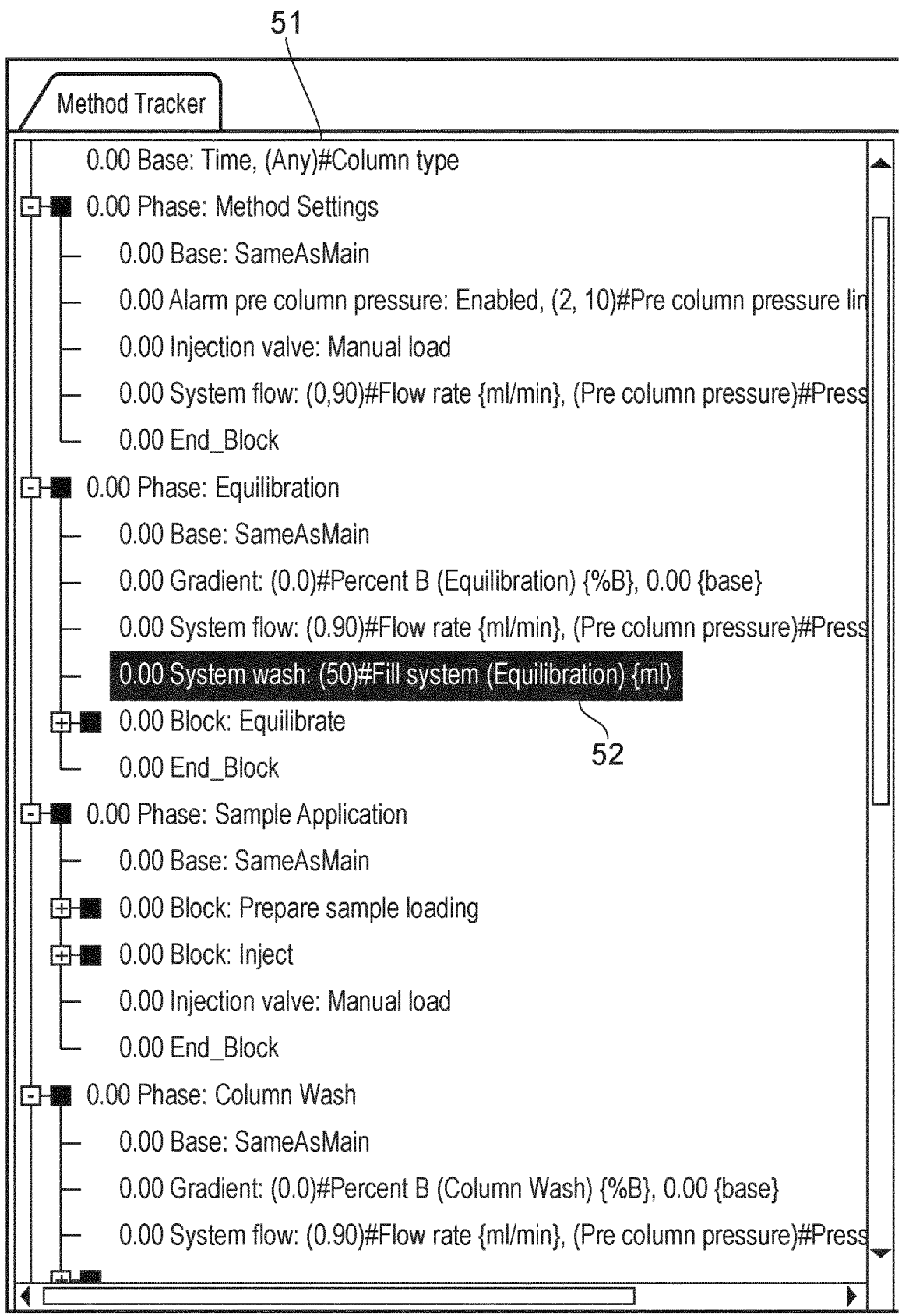
FIG. 5 illustrates schematically an example of a software interface view used when monitoring a biopharmaceutical process.
Figure 5:
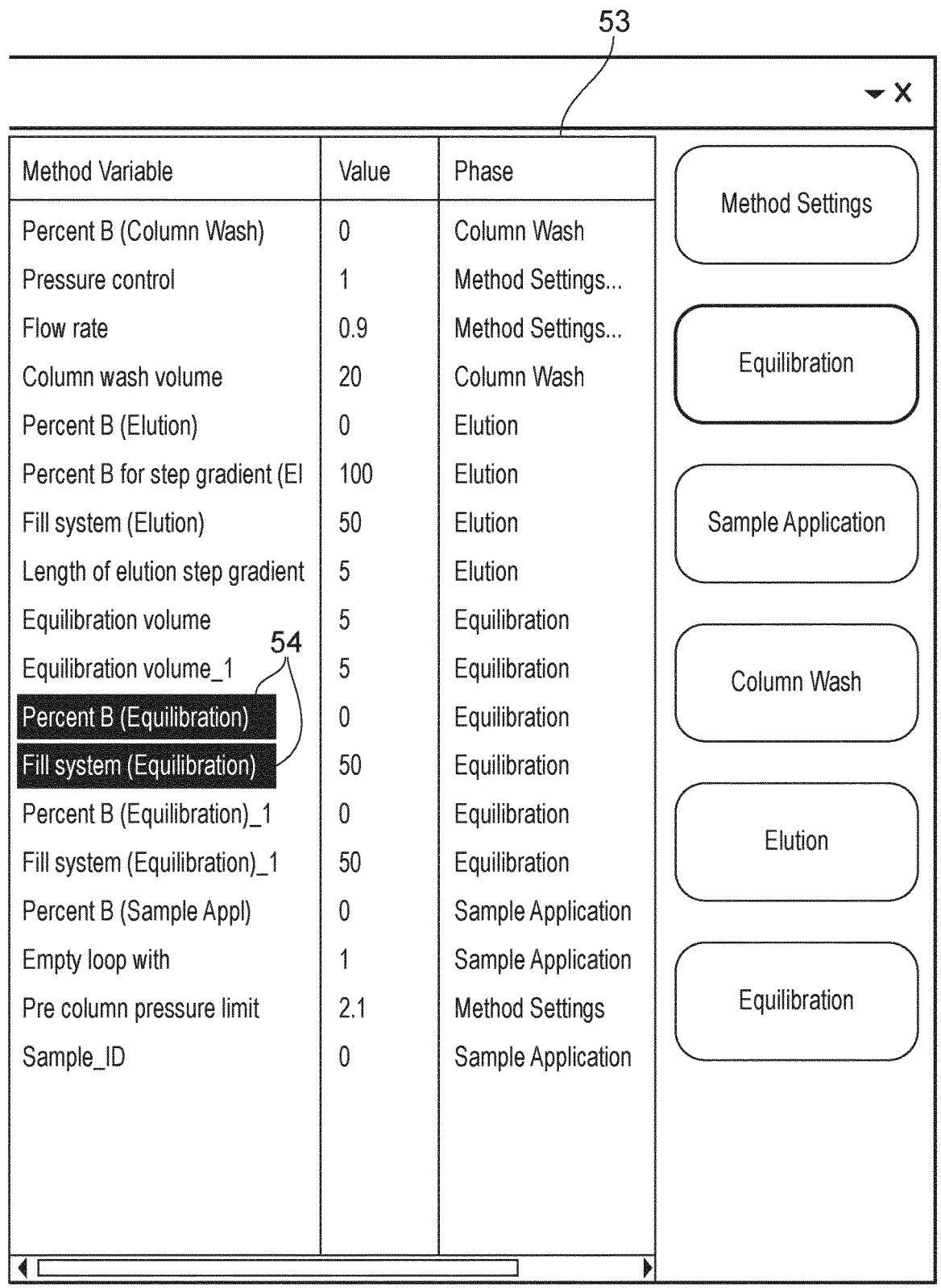

FIG. 5 illustrates a snapshot of a display view of tracking running of a biopharmaceutical process. Once running of the process has been started, the biopharmaceutical process will be tracked. Thus, the execution according to the execution scheme of the instructions for controlling the biopharmaceutical process are tracked. Examples of how this tracking may be performed are given in relation to FIGS. 1-3.

In the illustrated example in FIG. 4, the tracking is performed by means of Method Tracker Control software. The Tracker Control software is for example provided at the biopharmaceutical process monitoring element as discussed herein. The Tracker Control software may be arranged to present the tracking at a display of the biopharmaceutical process monitoring element, for example the display as discussed in relation to FIG. 1.

The Method Tracker Control software is characteristically arranged to display running of the bio-pharmaceutical process. In FIG. 5, a left side view illustrates a display view of the set of instructions, at least partly corresponding to the view used in programming. Thus, the entire set of instructions or a subset of the set of instructions, which subset is large enough to provide the user with an overview of where in the entire set of instructions the subset is positioned, is illustrated in this left side view. In the illustrated example, the set of instructions define a plurality of phases each comprising a subset of the set of instructions. In the illustrated example, a method setting phase, an equilibration phase, a sample application phase, and a column wash phase are defined each comprising a corresponding subset of the set of instructions. For each phase the corresponding set of instructions are executed step by step. This is illustrated in the illustrated display view, at least partly corresponding to the view used in programming.

Further, in the left side view 51, a marker 52 is present indicating the currently running instruction or the instruction, which has just been finished. Thus, in the illustrated left side view 51, an execution status indication relating the instruction presently executed or just finished to its position in the set of instructions is presented. It is clear from the illustrated display view that a system wash step of the equilibration phase is presently executed or has just been finished.

In a right side view 53, process variables (denoted method variables in the figure) defining the biopharmaceutical process, are displayed. In the illustrated example, the process variables are presented in a phase-by-phase order. For each phase of the process, process variables associated thereto are defined. The respective process variable may be relevant for an entire phase or a part of the phase of a single step of the phase. Thus, each variable may be associated to that phase and/or part of phase and/or single step of the phase to which the variable is relevant. In the illustrated example, the phase column wash is associated to a variable "Percent B" which is set to the value 0. Further, the method setting phase is in the illustrated example associated to a "pressure control" variable which is set to the value 1. The method setting phase is further in the illustrated example associated to a "flow rate" variable, which is set to 0.9. Further, the column wash phase in the illustrated example is associated to a "column wash volume" variable which in the illustrated example is set to 20. For each phase process variables are defined in the same manner and values are associated thereto.

One or a plurality of process variable markers 54 are presenting indicating the process variable(s) relevant for the currently executed or just finished instruction.

The values may be amended at any time during execution of the process. Also variables and/or phases may be added and/or removed during execution of the process. This strongly contributes to the reducing time in for example testing and fine-tuning of the process before manufacture of a new product or batch. This in turn helps to reduce costs.

Further, other information may be shown in the display view, such as sensor data obtained by the sensors of the processing system. Some of the sensor data may be relating to a specific process variable. The sensor data may then be displayed in relation to said process variable. For example, the sensor data may be displayed in a column beside the variable column at a row corresponding to the variable to which the sensor data relates. The sensor data column may present a quantity measured by the sensor and the measured sensor value. Some of the sensor data may relate to the entire process or a part thereof. This sensor data may be presented at a location for display of general data relating to the process. Also this sensor data may present a quantity measured by the sensor and the measured sensor value.

FIG. 6 illustrates an example of accessing a display view, disclosing more detailed information than the information presented in the display view as discussed in relation to FIG. 5. In the example illustrated in FIG. 6, the marked process variable or another process variable may be clicked at to get more detailed information relating to the process variable. In detail, in the illustrated example a menu is presented when clicking at the marked process variable or another process variable, and an option "Show Detailed Debugger Info" may be selected for viewing the detailed information.

The invention claimed is:

1. A method for monitoring a bio-pharmaceutical process, said bio-pharmaceutical process being controlled based on as set of instructions for controlling said biopharmaceutical process, the method comprising the following steps performed by a bio-pharmaceutical process monitoring element:
   obtaining said set of instructions for controlling the bio-pharmaceutical process; and
   while the instructions of the set of instructions for controlling the biopharmaceutical process are executed, for each executed instruction:
   a) receiving an execution status update indicating which instruction is presently executed or has just been finished,
   b) forming an execution status indication relating the instruction presently executed or just finished to its position in the set of instructions based on the received execution status update, and
   c) displaying at least the set of instructions and the execution status indication for each instruction of the set of instructions;
   wherein the set of instructions include a plurality of phases, each comprising a subset of the set of instructions,
   wherein the execution status indication is displayed by marking the presently executed or just finished instruction in a display view, and
   wherein also a next instruction for execution is indicated in the display view.

2. The method according to claim 1, further comprising:
   while a controller for controlling the bio-pharmaceutical process controls execution of the instructions of the set of instructions for controlling the biopharmaceutical process, for each executed instruction the controller transmits the execution status update to the bio-pharmaceutical process monitoring element.

3. The method according to claim 1, further comprising:
   obtaining at the biopharmaceutical process monitoring element sensor data related to the bio-pharmaceutical process; and
   for at least a part of the instructions presently executed or just finished, correlating corresponding obtained sensor data with the execution status indication.

4. The method according to claim 1, further comprising, for at least a part of the instructions presently executed or just finished, displaying the corresponding obtained sensor data.

5. The method according to claim 4, wherein a next instruction for execution is also displayed.

6. The method according to claim 4, wherein the set of instructions are displayed in the display view, said display view corresponding to the view used in programming.

7. The method according to claim 1, further comprising, for at least a part of the instructions presently executed or just finished, storing the execution status indication and possibly the corresponding obtained sensor data, if the latter is present.

8. The method according to claim 1, wherein the set of instructions for controlling the biopharmaceutical process comprises or is associated to at least one process variable value defining the biopharmaceutical process, said method comprises a step of:
   obtaining, during execution of the set of instructions, at the biopharmaceutical process monitoring element an update of at least one of said process variable value defining the biopharmaceutical process; and
   receiving, during the execution of the set of instructions, at a controller for control of the biopharmaceutical process information relating to the update for updated control of the biopharmaceutical process.

9. The method according to claim 8, wherein the update of at least one of said process variable value is received via a user interface.

10. The method according to claim 8, wherein the bio-pharmaceutical process monitoring element:
    monitors the obtained sensor data related to the bio-pharmaceutical process;
    detects when the obtained sensor data deviates from a predetermined pattern or value or boundary/boundaries; and
    determines that at least one potential process variable value should be updated based on said detected deviation.

11. The method according to claim 10, wherein control of the biopharmaceutical process is automatically updated based on the at least one potential process variable value or wherein the at least one potential process variable value is fed to a user interface for acceptance/rejection/amendment by the user.

12. The method according to claim 1, wherein said bio-pharmaceutical process is a chromatographic process or method, and said instructions include chromatographic process or method steps, optionally comprising or including a recipe or recipe steps.

13. The method according to claim 12, further comprising displaying on the display a currently running chromatographic process/method step or the recipe or recipe step, and in the same display view, displaying a predefined process/method step or the recipe or recipe step, corresponding to the currently running process/method step or the recipe or recipe step.

14. A system for monitoring a bio-pharmaceutical process, said system comprising:
    a processing system comprising:
       processing equipment wherein said bio-pharmaceutical process is performed; and
       a controller arranged to store a set of instructions for controlling the biopharmaceutical process and executing the instructions of the set of instructions for generating control signals controlling the processing equipment,
    wherein the controller is further is arranged to, for each executed instruction, generate and transmit an execution status update indicating which instruction is presently executed or has just been finished,
    wherein the system further comprises a bio-pharmaceutical process monitoring element arranged to receive said execution status indication and to form an execution status indication relating the instruction presently executed or just finished to its position in the set of instructions based on the received execution status update,
    wherein the system further comprises a display arranged to display at least the set of instructions and the execution status indication for each instruction of the set of instructions, wherein the set of instructions include a plurality of phases, each comprising a subset of the set of instructions,
    wherein the execution status indication is displayed by marking the presently executed or just finished instruction in a display view, and
    wherein also a next instruction for execution is indicated in the display view.

15. The system according to claim 14, wherein the biopharmaceutical process monitoring element is arranged to store the set of instructions for controlling the biopharmaceutical process and wherein the forming of the execution status indication comprises to associate the received execution status update to a corresponding instruction in the stored set of instructions.

16. The system according to claim 14, wherein the display is arranged to display the set of instructions in the display view, said display view corresponding to the view used in programming.

17. The system according to claim 14, wherein the processing system further comprises a plurality of sensors arranged to monitor a status of the processing of the processing equipment and possibly the display is arranged to display the monitored status of the processing of the processing element.

18. The system according to claim 17, wherein the biopharmaceutical process monitoring element is arranged to, for at least a part of the instructions presently executed or just finished, correlating corresponding obtained sensor data with the execution status indication.

19. The method according to claim 17, further comprising a memory arranged to store the execution status indication and possibly the corresponding obtained sensor data, if the latter is present, for at least a part of the instructions presently executed or just finished.

20. The system according to claim 14, wherein the set of instructions for controlling the biopharmaceutical process comprises or is associated to at least one process variable value defining the biopharmaceutical process.

21. The system according to claim 20, wherein in response to obtaining of an instruction to update at least one process variable value during execution of the set of instructions, the biopharmaceutical process monitoring element is arranged to amend a display view based on the obtained process variable value update and to transmit the variable value update or information relating thereto to the controller, wherein the controller is arranged to generate control signals for controlling the processing equipment in accordance with the variable value update.

22. The system according to claim 21, further comprising a user interface for user of the instruction to update at least one process variable value.

23. The system according to claim 21, wherein the biopharmaceutical process monitoring element is arranged to
monitor the obtained sensor data related to the biopharmaceutical process,
detect when the obtained sensor data deviates from a predetermined pattern or value or boundary/boundaries and
determine that at least one potential process variable value should be updated.

\* \* \* \* \*